United States Patent [19]
Nakanishi et al.

[11] Patent Number: 5,268,221
[45] Date of Patent: Dec. 7, 1993

[54] FIBER REINFORCED RUBBER ARTICLES

[75] Inventors: Yasuyuki Nakanishi; Susumu Onoe; Hiroshi Matsuoka, all of Kobe, Japan

[73] Assignee: Bando Chemical Industries, Ltd., Kobe, Japan

[21] Appl. No.: 856,862

[22] Filed: Mar. 24, 1992

Related U.S. Application Data

[63] Continuation of Ser. No. 657,824, Feb. 20, 1991, abandoned.

[30] Foreign Application Priority Data

Feb. 23, 1990 [JP] Japan ............................. 2-43349

[51] Int. Cl.$^5$ ...................... D03D 13/00; D04H 1/00; F16G 1/28; F16G 5/20
[52] U.S. Cl. ................................. 428/222; 428/293; 428/294; 428/295; 428/390; 428/392; 57/204; 57/231; 57/401; 87/6; 87/9; 474/205; 474/260; 474/265; 152/556
[58] Field of Search ............... 428/222, 293, 294, 392, 428/390, 389, 385, 295; 57/401, 231, 204; 87/6, 9; 474/205, 260, 265; 152/556

[56] References Cited

U.S. PATENT DOCUMENTS

| | | | |
|---|---|---|---|
| 1,252,703 | 1/1918 | Kline | 152/556 |
| 1,400,301 | 12/1921 | McClurg | 152/556 |
| 2,430,500 | 11/1947 | Freedlander et al. | 474/260 |
| 2,955,969 | 10/1960 | Runton | 474/260 |
| 3,584,516 | 6/1971 | Burpulis | 474/265 |
| 3,653,197 | 4/1972 | Morieras et al. | 174/117 F |
| 3,660,151 | 5/1972 | Weimar, Jr. | 428/380 |
| 3,711,630 | 1/1973 | Morieras et al. | 174/119 |
| 3,818,741 | 6/1974 | Terhume | 428/131 |
| 3,871,946 | 3/1975 | Romanski et al. | 474/260 |
| 3,902,542 | 9/1975 | Imamura et al. | 152/527 |
| 3,964,328 | 6/1976 | Redmond, Jr. | 474/205 |
| 4,015,038 | 3/1977 | Romanski et al. | 474/260 |
| 4,016,236 | 4/1977 | Nagasawa et al. | 264/184 |
| 4,042,443 | 8/1977 | Hoback et al. | 428/161 |
| 4,204,984 | 5/1980 | Neubert | 428/392 |
| 4,219,601 | 8/1980 | Inoue et al. | 428/222 |
| 4,343,333 | 8/1982 | Keister | 138/130 |
| 4,355,131 | 10/1982 | Wise | 428/378 |
| 4,438,796 | 3/1984 | Abe et al. | 152/525 |
| 4,473,617 | 9/1984 | van Leeuwen et al. | 428/373 |
| 4,497,168 | 2/1985 | Kamp | 57/401 |
| 4,567,917 | 2/1986 | Millard | 138/127 |
| 4,681,558 | 7/1987 | Rausch | 474/205 |
| 4,790,802 | 12/1988 | Onoe et al. | 57/204 |
| 4,850,186 | 7/1989 | Hiramatsu et al. | 57/236 |
| 4,898,212 | 2/1990 | Searfoss et al. | 138/130 |
| 4,914,902 | 4/1990 | Keefe, Jr. | 57/231 |

FOREIGN PATENT DOCUMENTS

| | | |
|---|---|---|
| 0069957A3 | 7/1982 | European Pat. Off. . |
| 0206591A2 | 6/1986 | European Pat. Off. . |
| 458128 | 11/1991 | European Pat. Off. ............ 474/205 |
| 466169 | 1/1992 | European Pat. Off. ............ 474/205 |
| 3718193 | 12/1988 | Fed. Rep. of Germany . |
| 56-103008 | 8/1981 | Japan . |
| 59-19744 | 2/1984 | Japan . |
| 62-3921 | 1/1987 | Japan . |
| 63-145103 | 6/1988 | Japan . |
| 2-014054 | 1/1990 | Japan . |
| 3-36025 | 2/1991 | Japan . |

Primary Examiner—George F. Lesmes
Assistant Examiner—Terrel Morris
Attorney, Agent, or Firm—Wenderoth, Lind & Ponack

[57] ABSTRACT

A rubber article having a fiber reinforcement embedded therein. The reinforcement comprises a cylindrically braided cord of an even number of twisted yarns of four or more, an equal number having an twist, i.e. twisted to the right, and a Z-twist, i.e. twisted to the left. The angle difference between a first twisting angle of a yarn and a final twisting angle of the cylindrically braided cord is set at less than 10°.

9 Claims, 3 Drawing Sheets

FIBER REINFORCED RUBBER ARTICLES

This application is a continuation of now abandoned application, Ser. No. 07/657,824 filed on Feb. 20, 1991.

BACKGROUND OF THE INVENTION

The present invention relates to a fiber reinforced rubber article, particularly, the reinforcement embedded in a rubber article.

Since high plessley, high elasticity, high dimensional stability, and high adhesive strength has been required for rubber articles such as a belt, a tire, and a hose, a reinforcing cord constructed of fibers or of a reinforcing canvas is embedded in the rubber. Generally, a cord of twisted yarns is used for the reinforcement. The yarn may be all twisted, only half of them twisted, or lang lay. The yarns, all of them being twisted, are most popular for reinforcement for a rubber article.

However, the monofilaments in an all twisted yarn rub each other at a sharp angle in a rubber article, and the yarn is worn out, broken, or decreased plessley in the rubbed part after a short period of usage. Therefore, the flex fatigue of the cord is lowered.

Japanese Patent Application Laid Open Gazette No. 59-19744 proposed a fiber reinforced rubber article, in which the reinforcement is constructed of cords, half of the yarns being twisted, or lang lay, to solve the problem of lowered flex fatigue.

However, a rubber article reinforced by cords in which only half of the yarns are twisted or lang lay is lowered in elongation and rate of tensile elasticity after the dipping process, compared with a rubber article reinforced by cords in which all of the yarns are twisted. This results in lower dimensional stability.

On the other hand, a braided cord has been made for various purposes. A cylindrically braided cord which needs more than four yarns and an even number of yarns to make a cylindrical configuration, surpasses a twisted cord in flex fatigue and dimensional stability due to its constructional characteristics. Therefore, the cylindrically braided cord will improve both the flex fatigue resistance and dimensional stability if it is used as a reinforcement for a rubber article.

Moreover, in the case where the cylindrically braided cord is used for the reinforcement of a rubber article, if the yarns constructing the cord are twisted, the cord is arranged orderly and consequently, a higher strength of the a cylindrically braided and a longer service life of the rubber article is expected. On the other hand, if all the yarns, first twisted to the right and first twisted to the left, are twisted in the same direction, the cylindrically may possess a direction and a rubber article reinforced by such a cylindrically braided cord possessing a direction may not obtain a satisfactory result in flex fatigue resistance. For the above reason, yarns, first twisted to the right and first twisted to the left, need to be turned in the reverse direction of the first twist. However, even if such yarns, first twisted to the right and first twisted to the left, are turned in the reverse direction of the first twist, the ideal dynamic adhesive strength may not be obtained.

SUMMARY OF THE INVENTION

The object of the present invention is to use a cylindrically braided cord instead of a twisted cord for a reinforcement, to specify the direction of the yarns, and to properly set a first twisting angle of a yarn and a final twisting angle of a cylindrically braided cord so as to provide a rubber article with high flex fatigue, dimensional stability, and longer service life. A further object is to improve the dynamic adhesive strength of a rubber article.

In order to achieve the above objects, according to the present invention, the reinforcement to be embedded in the rubber article is constructed of cylindrically braided cord composed of more than four yarns, and even number of yarns, each yarn being either an S-twist, i.e. twisted to the right, or a Z-twist, i.e. twisted to the left. Moreover, an angle difference between the first twisting angle of a yarn and the final twisting angle of a cylindrically braided cord is set within 10°.

DESCRIPTION OF THE PREFERRED EMBODIMENT

A preferred embodiment will be described below with reference to the accompanying drawings.

Figure 4:
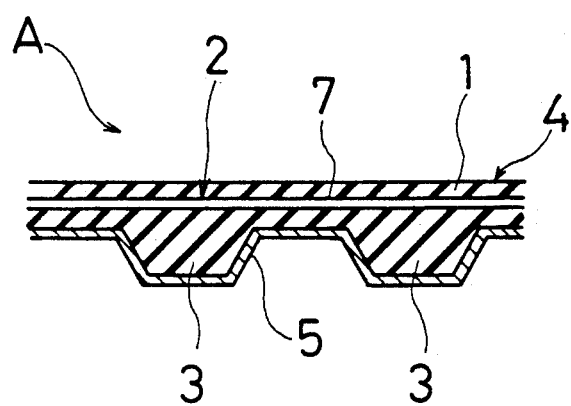
FIG. 4 is an enlarged vertical front section of a toothed belt.

FIG. 4 illustrates a toothed belt A as a fiber reinforced rubber article. The toothed belt A comprises a belt base 4 having an stretching rubber ply 1 and a plurality of teeth 3 formed over one side thereon (the underside of the belt base in FIG. 4) and made of the same material, a rubber, as the stretching rubber ply 1 (only two teeth are shown in FIG. 4). A fiber reinforcement 2 is embedded on the stretching rubber ply 1 of the belt base 4. A canvas layer 5 is adhered to a surface of teeth 3 of the belt base 4.

Figure 1:
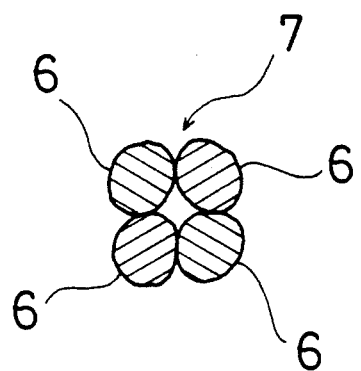
FIG. 1 is an enlarged vertical side section of a cylindrically braided cord.
Figure 3:
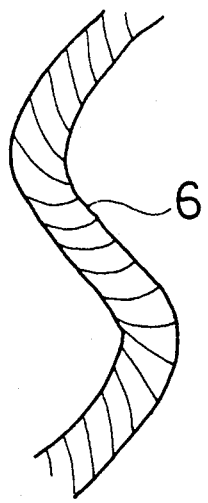
FIG. 3 is an enlarged view of a yarn twisted to the right.
Figure 2:
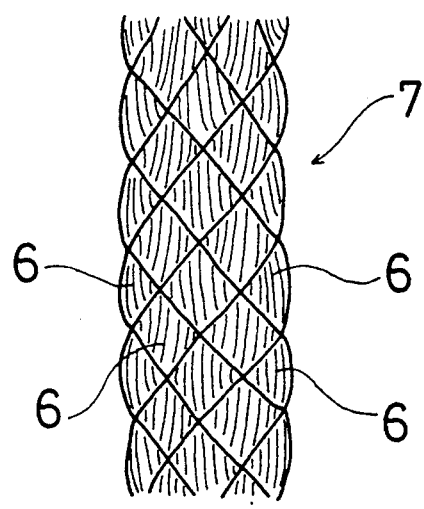
FIG. 2 is an enlarged vertical front section of a cylindrically braided cord.

The present invention is characterized in that the reinforcement 2, as enlargely shown in FIGS. 1 and 3, is constructed of cylindrically braided cords 7 of more than four and an even number of yarns 6 (four yarns in the present embodiment), each yarn is either an S-twist, twisted to the right (refer to FIG. 3), or a Z-twist, twisted to the left. And an angle difference between the first twisting angle of yarns 6 and the final twisting angle of the cylindrically 7 is set at less than 10°.

The yarn 6 may be composed of an inorganic fiber, an organic fiber, or a metallic fiber. Further, a short or long fiber spun yarn or combination of those can be used for the yarn 6 according to the required performance of the toothed belt A. Also, the number of yarns 6 can be any even number if it is more than 4. In order to make a cord of cylindrically configuration, more than four and an even number of yarns are required. An industrial braiding machine cannot make a cord of a cylindrically configuration by using odd numbered yarns when yarns of the same denier number are used. Also, the total denier number and the number of monofilament vary according to the required performance of the toothed belt A. The error of twisting angle of the S-twist and Z-twist is set within ±3°. When the all twisted yarns or lang lay are used for the yarns 6, the twisting direction and the number of twists refer to the final twists.

The cylindrically braided cord 7 go through an adhesive process, in which the cord is soaked into the adhesive combined with epoxy resin, isocyanate compound, ethylene urea compound, and resorcin formalin latex (RFL), etc. and a stretching process before it is embedded in the stretching rubber ply 1. A dipping process is preferable for the adhesive process in order to soak the adhesive evenly from the surface to the inside of it.

The result of a flex fatigue test is shown in Table 1, comparing the above constructed toothed belt A with a comparable example. The numerals of Table 1 show a pulling adhesive strength of a cylindrically braided cord.

CONSTRUCTION OF TOOTHED BELT A ACCORDING TO THE PRESENT INVENTION

Four 1500de (the number of total denier is 6000de) Kevlar (product of DuPont) composed of aramid fibers are used for a cylindrically braided cord 7 constructing a reinforcement 2.

S-twist is the yarn twisted to the right having the twisting angle 20° and Z-twist is the yarn twisted to the left having the twisting angle 20°. Four yarns turn in the direction contrary to the first twisting direction are used for the reinforcement having a twisting angle of the cylindrically braided cord 20°. The cylindrically braided cord 7 is dipped into the isoayanate compound so as to form a sub-coat ply, then it is dipped into the adhesive combination liquid of resorcin formalin latex (RFL) so as to form a second-coat ply, further it is dipped into chloroprene rubber so as to form a top-coat ply, and finally stretching process is carried out with 1 g/de tension. The toothed belt A wherein the reinforcement 2 composed of a plurality of the cylindrically braided cords 7 is embedded on the belt base 4 is obtained in the following steps: a plurality of tubular braids 7 finished the stretching process is put spirally on the stretching rubber ply 1 of the chloroprene rubber, and the teeth 3 of the chloroprene rubber is formed on it so that the cylindrically braided cord 7 is embedded thereon, thereafter, the nylon cloth 5 is adhered to the surface of teeth 3 and the rubber is cured. The adhesive is soaked evenly from the surface to the inside of the cylindrically braided cord 7 during the adhesive process.

TOOTHED BELT OF COMPARABLE EXAMPLE

S-twist is twisted to the right having the twisting angle 5°; and Z-twist is twisted to the left having the twisted angle 5°. The twisting angle of the cylindrically braided cord is 25°. Other features are the same as the belt of the present invention.

TEST ON FLEX FATIGUE

Figure 5:
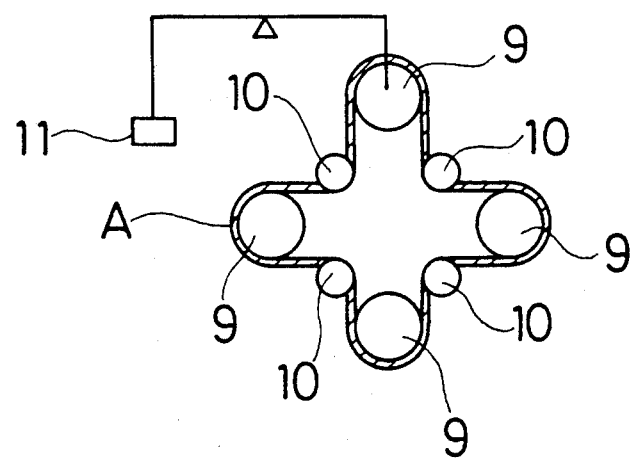
FIG. 5 is an explanatory drawing of the testing system for a flex fatique.

The test was carried out by the system shown in FIG. 5, where the toothed belt A is wound around four large pulleys 9 and four small pulleys 10 disposed between large pulleys 9, and a predetermined tension is applied to the toothed belt A by a weight 11. The toothed belt A is run, and the pulling adhesive strength was measured. The above small pulleys 10 are 30 mm in diameter. One cycle is defined the toothed belt A goes through all the four small pulleys 10, i.e., the number of belt flex is four.

TABLE 1

| | Belt Flex Number | | |
|---|---|---|---|
| | $1 \times 10^6$ | $1 \times 10^7$ | $1 \times 10^8$ |
| Present Embodiment | 60.5% | 58.7% | 58.9% |
| Comparable example | 62.4% | 57.5% | 47.5% |

As shown in the test data on table 1, for example, at the belt flex number $1 \times 10^8$, the pulling adhesive strength of the present invention is 58.9%, which is little decrease in strength. However, the pulling adhesive strength of the comparable example is 47.5%, which is great decrease strength. This big difference between the two belts results from, in this embodiment, the twisting angle of the yarn 6 is the same as the twisting angle of the cylindrically braided cord 7 and the monofilament angle to the axial line of the cylindrically braided cord 7 is 0°, therefore, higher resistance of the monofilament to shearing stress by a matrix rubber is obtained. The toothed belt A possesses greater dynamic adhesive strength.

Figure 6:
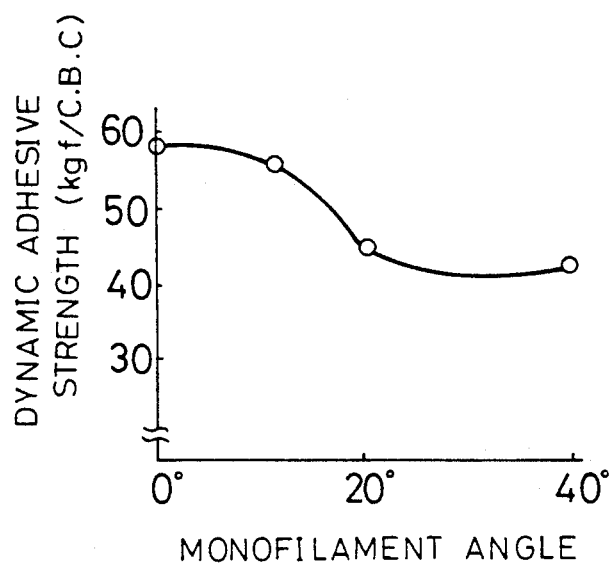
FIG. 6 is a map showing a relation between the monofilament angle to the axial line of a cylindrically braided cords and the dynamic adhesive strength of the cord.

FIG. 6 shows the relation between a monofilament angle to the axial line of the cord on the surface of the cylindrically braided cord 7 of the toothed belt A and a dynamic adhesive strength (kgf/C.B.C). Here, C.B.C stands for the cylindrically braided cord yarn. The test is carried out under the same condition as the test of table 1 and the belt is run at $1 \times 10^8$ belt flex. The test data shows that the dynamic adhesive strength is greater when the monofilament angle to the axial line of the cord is less than 10°.

As shown in the above, in this embodiment, the reinforcement 2 is constructed by the cylindrically braided cord 7 which is made of more than four and even numbered yarns, S-twist yarn 6 twisted to the right and Z-twist yarn 6 twisted to the left. The angle difference between the twisting angle of the yarn 6 and the twisting angel of the cylindrically braided cord 7 is set less than 10°.

The cylindrically braided cord 7 is characterized in that the even stress is applied to the monofilament composing the yarns and the direction of the yarns 6 is offsetted by the S-twist and Z-twist. This results in higher flex fatigue and longer service life of the toothed belt A. Moreover, the dimensional stability of the toothed belt A is higher in the present embodiment than in the twisted cord due to the characteristic of the cylindrically braided cord 7.

Moreover, in the present embodiment, the twisting angle of the yarn 6 is the same as the twisting angle of the cylindrically braided cord 7 and accordingly, the angle of the monofilament to the axial line of the cord of the cylindrically braided cord 7 is 0°. Consequently, the dynamic adhesive strength is greatly improved by higher resistance of the matrix rubber of the monofilament to the shearing stress.

In the above embodiment if the center cord is provided in a hollow part of the cylindrically braided cord 7, the dimensional stability, in addition to the flex fatigue, will be improved.

Moreover, in the present embodiment, the toothed belt A is shown for a rubber. However, the belt is not limited to the toothed belt A, but covers an industrial belt such as a conveyor belt and a transmission belt like a flat belt and a ribbed belt. The present invention also can be applied to rubbers other than belts, for example, tires and hoses.

What is claimed is:

1. A transmission belt, comprising a belt base composed of a rubber ply, a plurality of teeth formed on one side of said rubber ply, said plurality of teeth being composed of the same material as said rubber ply, and a fiber reinforcement embedded in said rubber ply, said fiber reinforcement comprising:
   a cylindrically braided cord formed by an even number of at least four twisted yarns braided together at a final twisting angle so as to define a center hole along the axis of said cylindrically braided cord;
   wherein each said yarn is composed of monofilaments twisted together at a first twisting angle, wherein half of said yarns have their said monofilaments twisting in the s-twist direction while the remaining half of said yarns have their said monofilaments twisting in the z-twist direction; and
   wherein the angular difference between the first twisting angle and the final twisting angle is less than 10°, such that the angle of said monofilaments of said yarns to the axis of said cylindrically braided cord is less than 10°.

2. The transmission belt of claim 1, wherein the first twisting angle and the final twisting angle are the same, such that the angle of said monofilaments of said yarns to the axis of said cylindrically braided cord is 0°.

3. A transmission belt according to claim 1, wherein said cylindrically braided cord is composed of yarns of inorganic fibers.

4. A transmission belt according to claim 1, wherein said cylindrically braided cord is composed of yarns of organic fibers.

5. A transmission belt according to claim 4, wherein said organic fibers are aramid fibers.

6. A transmission belt according to claim 1, wherein said cylindrically braided cord is composed of yarns of metallic fibers.

7. A transmission belt according to claim 1, wherein said cylindrically braided cord is composed of long fiber spun yarns.

8. a transmission belt according to claim 1, wherein said cylindrically braided cord is composed of short fiber spun yarns.

9. A transmission belt according to claim 1, wherein a center cord is provided in said center hole of said cylindrically braided cord.

* * * * *